United States Patent
Beutin et al.

(10) Patent No.: US 8,026,624 B2
(45) Date of Patent: Sep. 27, 2011

(54) TURBOJET COMPRISING A CURRENT GENERATOR MOUNTED IN THE FAN AND A METHOD OF MOUNTING SAID GENERATOR IN THE FAN

(75) Inventors: Bruno Albert Beutin, Evry (FR); Antoine Olivier Francois Colin, Brunoy (FR)

(73) Assignee: SNECMA, Paris (FR)

( * ) Notice: Subject to any disclaimer, the term of this patent is extended or adjusted under 35 U.S.C. 154(b) by 443 days.

(21) Appl. No.: 12/179,911

(22) Filed: Jul. 25, 2008

(65) Prior Publication Data

US 2009/0039653 A1 Feb. 12, 2009

(30) Foreign Application Priority Data

Aug. 7, 2007 (FR) ...................................... 07 05757

(51) Int. Cl.
*F02C 6/00* (2006.01)
(52) U.S. Cl. ......................................... 290/52; 60/221.6
(58) Field of Classification Search ........................ None
See application file for complete search history.

(56) References Cited

U.S. PATENT DOCUMENTS

| | | | |
|---|---|---|---|
| 3,900,274 A | | 8/1975 | Johnston et al. |
| 4,490,622 A | * | 12/1984 | Osborn ............................ 290/52 |
| 5,282,719 A | | 2/1994 | McCarty et al. |
| 5,867,979 A | * | 2/1999 | Newton et al. ................ 60/226.1 |
| 6,378,293 B1 | * | 4/2002 | Care et al. ..................... 60/226.1 |
| 7,134,271 B2 | * | 11/2006 | Baughman et al. ........... 60/226.1 |
| 7,448,199 B2 | * | 11/2008 | Johnson ........................ 60/226.1 |
| 7,692,326 B2 | * | 4/2010 | Ono et al. ......................... 290/52 |
| 7,698,884 B2 | * | 4/2010 | Maguire et al. ............. 60/39.163 |
| 2008/0246281 A1 | * | 10/2008 | Agrawal et al. .................. 290/52 |

FOREIGN PATENT DOCUMENTS

| | | |
|---|---|---|
| EP | 1 662 636 A2 | 5/2006 |
| GB | 1174969 | 12/1969 |
| GB | 2 425 572 A | 11/2006 |

OTHER PUBLICATIONS

U.S. Appl. No. 12/246,604, filed Oct. 7, 2008, Colin.

* cited by examiner

*Primary Examiner* — Michael C Zarroli
(74) *Attorney, Agent, or Firm* — Oblon, Spivak, McClelland, Maier & Neustadt, L.L.P.

(57) ABSTRACT

A twin-spool gas turbine turbojet comprising a high-pressure rotor; a low-pressure rotor; a low-pressure rotor shaft connected to a fan housed in a fan casing; and a fixed cowl element centered on the axis of the engine, upstream of the fan, on which there is mounted an electric current generator designed to take mechanical power off the low-pressure rotor shaft and convert it into electrical power.

13 Claims, 2 Drawing Sheets

TURBOJET COMPRISING A CURRENT GENERATOR MOUNTED IN THE FAN AND A METHOD OF MOUNTING SAID GENERATOR IN THE FAN

BACKGROUND OF THE INVENTION

The invention relates to a gas turbine turbojet with an upstream fan and to a method of mounting an electric current generator in the turbojet.

Some of the power generated by an aeronautical turbojet engine is used to power various parts both of the turbojet and of the aircraft propelled in full or in part by that turbojet.

Some of this power is currently taken off the high-pressure (HP) compressor, the compressed air of which is used, particularly for pressurizing and conditioning the cabin of the aircraft, or alternatively for de-icing. Some of this power is taken mechanically off the shaft of the HP stage of the turbojet to drive the input shaft of an accessories gearbox positioned on a casing of the turbojet. This input shaft is rotationally driven by a transmission shaft extending through a structural arm of the casing and itself driven by a pinion secured to the HP shaft.

There is a current trend toward increasing the installed electrical power so tapping mechanical power from the engine is anticipated.

However, drawing too much mechanical power has a detrimental effect on the operation of the HP spool because it is liable to adversely affect engine operability, particularly when the engine is running at low speed.

DESCRIPTION OF THE PRIOR ART

Patent Application FR 2882096 discloses taking some of the mechanical power off the low-pressure (LP) spool to drive the rotation of the input shaft of an accessories gearbox. A solution such as this entails structural modifications to the LP shaft 2 by adding a power transmission pinion to it. A system such as this is difficult to assemble because it involves moving around metallic parts that are bulky and heavy.

Patent Application WO2007/036202 also discloses mounting an electric current generator in the turbojet spool. The generator is made up of a stator element positioned circumferentially in the compression casing of the turbojet, and of rotor elements fixed to the ends of blades secured to the HP shaft and rotationally driven in the compression casing of the turbojet.

The rotational movement of the rotor elements induces a current in the stator element, which current is transmitted to the various pieces of equipment that require power. A current generator such as this is difficult to access and entails partial disassembly of the turbojet when it needs to be replaced or serviced. The compressor casing is of a small size, making it complicated to route the generated current to the various pieces of equipment.

SUMMARY OF THE INVENTION

In order to alleviate at least some of these disadvantages, the applicant company has proposed a twin-spool gas turbine turbojet comprising a high-pressure rotor and a low-pressure rotor, the low-pressure rotor shaft being connected, at its upstream end, to a fan housed in a fan casing, which turbojet comprises, upstream of the fan, a fixed cowl element centered on the axis of the engine and on which there is mounted an electric current generator designed to take mechanical power off the low-pressure rotor shaft and convert it into electrical power.

The turbojet advantageously allows power not to be taken from the HP rotor shaft. The current generator is simple to access, allowing it to be replaced in a limited length of time by dismantling a minimum number of turbojet components.

The current generator is positioned upstream of the fan, in a cool region of the turbojet, thus reducing its need for cooling and therefore its mass.

The current generator comprises a stator element connected to the fixed cowl element, and a rotor element driven by the upstream end of the low-pressure rotor shaft.

According to one embodiment, the turbojet comprises a fan disk on which the fan blades are mounted. A rotor element of the current generator is rotationally driven by a journal secured to said fan disk.

The cowl element is advantageously connected to the fan casing by radial retaining arms.

The radial arms allow the stator element of the generator to be held securely without requiring substantial structural modifications to the turbojet.

Ducts for lubricating the current generator and electric cables are formed in the radial retaining arms.

According to another embodiment, power transmission pinions are formed respectively on the rotor element of the current generator and on the upstream end of the low-pressure rotor shaft, the pinions meshing with one another in order to transmit the rotational movement of the low-pressure rotor shaft to the rotor element of the current generator.

The invention also relates to a method of mounting a current generator in the fan of a gas turbojet, in which:
- the current generator is mounted on the fixed cowl element;
- the fixed cowl element is positioned on the fan in such a way that the rotor element of the generator is in register with the upstream end of the low-pressure rotor shaft; and
- the cowl element is immobilized on the fan casing with the radial retaining arms.

The generator is simple to mount and this mounting is performed upstream of the turbojet. The components that need to be handled are small in size and light in weight thus allowing the current generator to be replaced quickly.

BRIEF DESCRIPTION OF THE DRAWINGS

Other features and advantages will emerge from the following description of the turbojet of the invention with reference to the figures in which.

DESCRIPTION OF THE PREFERRED EMBODIMENTS

Figure 1:
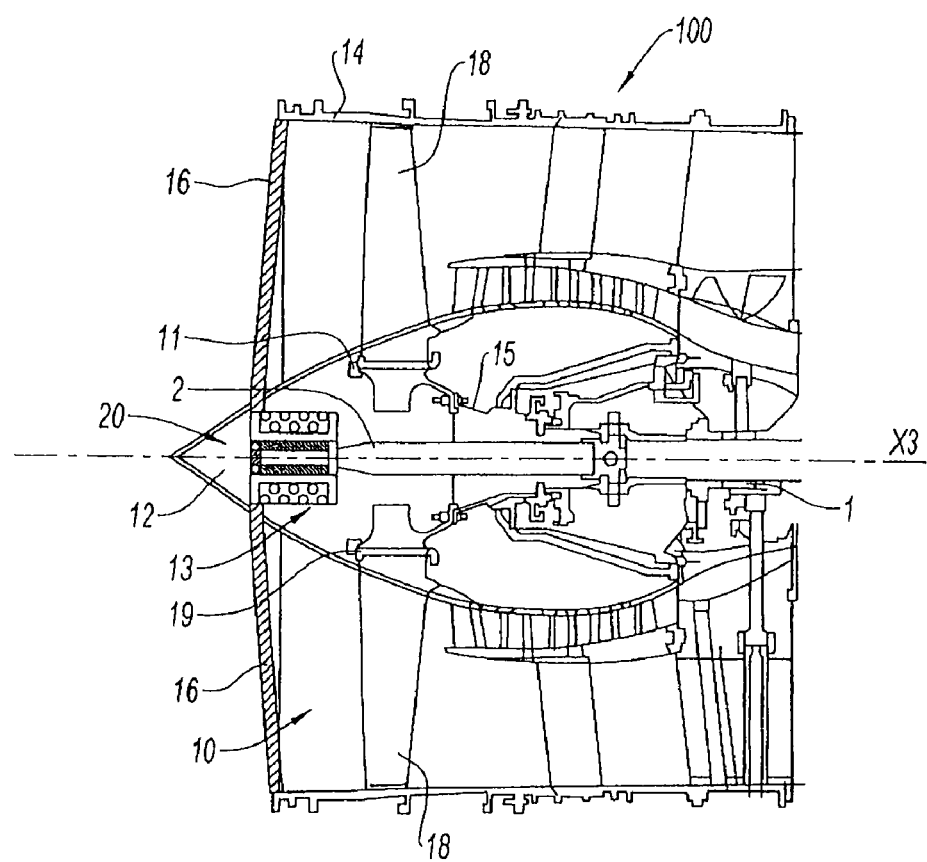
FIG. 1 depicts a sectioned view of the upstream part of a turbojet according to the invention with a current generator positioned in the fan of the turbojet.

With reference to FIG. 1, the turbojet of the invention is a twin-spool gas turbojet 100 comprising a low-pressure (LP) rotor and a high-pressure (HP) rotor 1, which are mounted so that they can rotate about the axis X3 of the turbojet. This type of turbojet is well known to those skilled in the art. The terms internal or external, inner or outer, when used in the description, will be understood to mean radially internal or external or on the inside or the outside of the turbojet, with respect to the axis X3 thereof.

Figure 4:
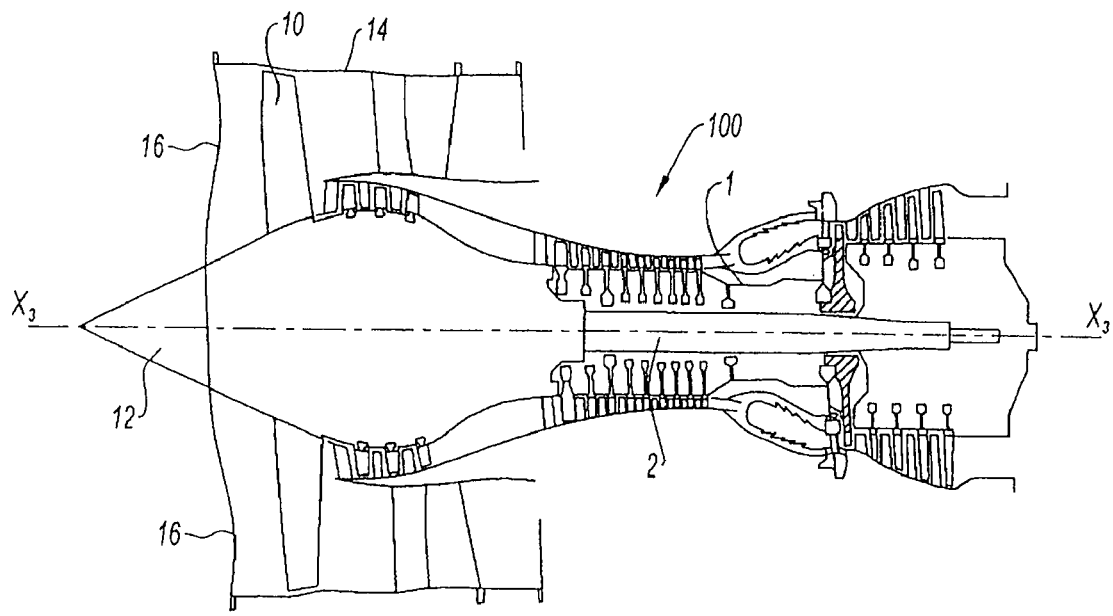
FIG. 4 depicts a general arrangement of the turbojet of the invention.

More specifically, with reference to FIG. 4, the turbojet functionally comprises, from the upstream direction downstream in the direction in which the gases flow, a fan 10, a compressor, a combustion chamber, a turbine and a jetpipe. As it is a twin-spool engine, it comprises an LP compressor upstream of an HP compressor, and an HP turbine upstream of an LP turbine.

The fan 10 in FIG. 1 comprises a fan disk 19 attached by a flange to a journal 15, itself supported by a bearing secured to the intermediate casing, the journal 15 here being secured to the low-pressure shaft 2.

The fan 10 further comprises a moving cowl element 11 which is fixed to the fan disk 19. The moving cowl element 11 is of frustoconical shape and guides the incoming air stream. A fixed cowl element 12 is positioned upstream of the moving cowl element 11.

The fan 10 is rotationally driven inside the fan casing 14 by the LP rotor shaft 2 which rotates as one with the moving cowl element 11. A housing 13 is formed in the moving cowl element 11.

Figure 2:
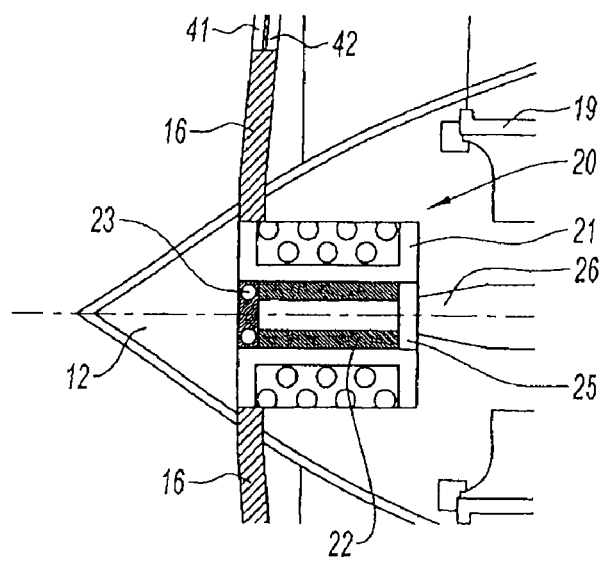
FIG. 2 depicts a close-up view of the current generator of FIG. 1.

With reference to FIG. 1 and more specifically to FIG. 2, an electric current generator 20 is mounted on the fixed cowl element 12, the generator 20 comprising a stator element 21, firmly attached to the fixed cowl element 12, and a rotor element 22 free to rotate with respect to the fixed cowl element 12.

In this instance, the rotor element 22 is an electromagnet extending axially along the axis X3. The stator element 21 is made up of windings which extend coaxially with respect to, and on the outside of, the rotor element 22. A bearing 23 supports the rotor element 22 as it rotates in the stator element 21.

As the electromagnet 22 rotates about the axis X3, a magnetic field is created and induces an electric current in the windings 21.

Radial retaining arms 16 structurally connect the fixed cowl element 12 to the fan casing 14, the stator element 21 of the current generator 20 thus remaining immobile as the fan blades 18 rotate. The retaining arms 16 are attached by a flange to the fan casing 14.

The retaining arms 16 are advantageously hollow and can house ducts 41 for lubricating the current generator 20 and electric cables 42 depicted in FIG. 2. The upper retaining arm 16 is depicted showing hidden detail over part of its length so that the ducts 41 for lubricating the current generator 20 and the electric cables 42 may be seen.

The ducts 41 for lubricating the current generator 20 allow a lubricant, such as oil, to be carried from an oil tank, positioned downstream of the fan, to the current generator 20 to cool and lubricate the current generator 20.

Once the current generator 20 has been cooled, hot oil flows through the retaining arms 16 thus de-icing the arms and cooling the oil. Such lubricating ducts 41 make it possible to reduce the size of the heat exchangers needed for cooling said oil.

The electric cables 42 allow the current generated in the windings 21 to be led away to electrical equipment positioned downstream of the engine.

The retaining arms 16 of the fixed cowl element 12 in this instance are shaped so as to conduct the incoming air stream toward the fan blades 18. The retaining arms 16 are three in number here, spaced 120° apart. It goes without saying that this number may change according to the configuration of the engine.

In this exemplary embodiment, the rotor element 22 is connected directly to the upstream end of the low-pressure rotor shaft 2. Power transmitting bevel gear pinions 25, 26 are formed respectively on the rotor element 22 of the current generator 20 and on the upstream end of the low-pressure shaft 2, the pinions 25, 26 meshing with one another in order to transmit the rotational movement of the low-pressure shaft 2 to the rotor element 22 of the current generator 20.

As the turbojet engine 100 runs, the low-pressure rotor shaft 2 is rotationally driven by the low-pressure turbine of the turbojet 100.

The low-pressure rotor shaft 2 rotates the electromagnet 22 about the axis X3 and induces an electric current in the windings 21 of the current generator 20. The current is carried by the retaining arms 16 of the fixed cowl element 12 via the electric cables 42 positioned in the arms 16, the equipment situated mainly downstream of the fan therefore being supplied with electric current.

Figure 3:
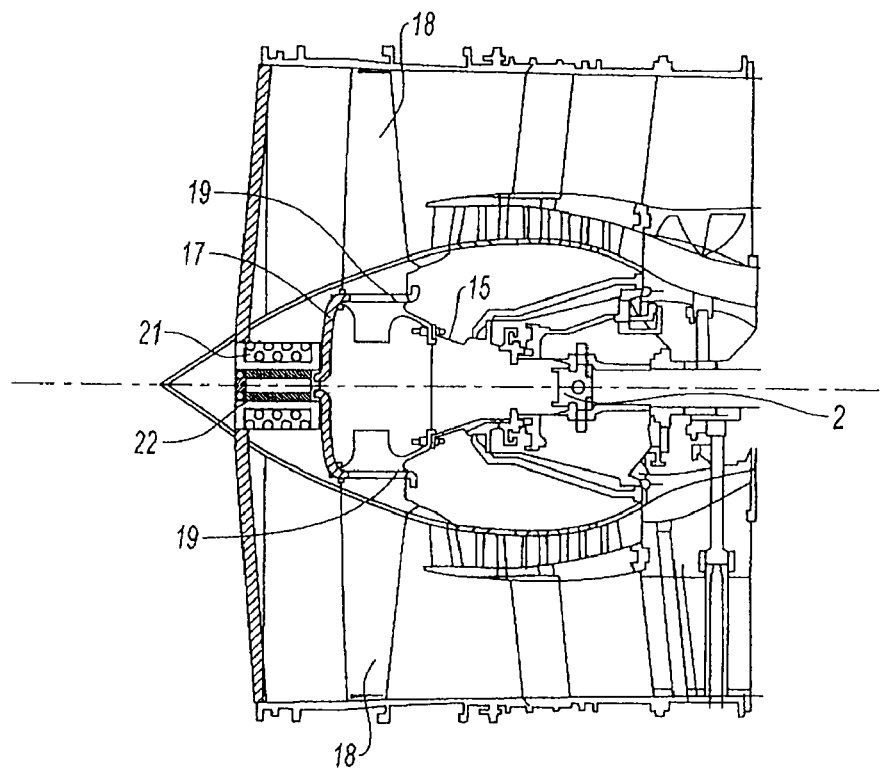
FIG. 3 depicts another embodiment of the invention.

In another form of embodiment, with reference to FIG. 3, an additional journal 17 is mounted between the fan disk 19 and the rotor element 22 of the current generator 20, the fan disk 19 supporting the fan blades 18. The journal 17, which rotates as one with the LP rotor shaft 2, drives the rotation of the rotor element 22.

The journal 17 is connected by a screw-nut connection to the fan disk 19 and to the rotor element 22. The way in which the current generator 20 is fixed with the fixed cowl element 12 remains the same; it is only the way in which the rotor element 22 is driven that differs from the previous embodiment.

The invention also relates to the method of mounting the current generator 20 in the turbojet 100.

The current generator 20 is mounted on the fixed cowl element 12. The current generator 20 is screwed to the cowl in this instance.

The fixed cowl element 12 is positioned on the fan 10 in such a way that the rotor element 22 of the generator 20 is in register with the upstream end of the low-pressure rotor shaft 2.

The power transmitting bevel gear pinion 25 of the stator element 22 is brought into register with the power transmission bevel gear pinion 26 of the low-pressure rotor shaft 2.

The fixed cowl element 12 is then immobilized on the fan casing 14 with the radial retaining arms 16.

The ducts 41 for lubricating the current generator 20 are connected to the current generator 20 in order to supply the current generator 20 with oil, the electric cables 42 being connected to the windings of the stator element 21 of the current generator 20 so as to carry the current to the various pieces of equipment of the aircraft.

The invention claimed is:

1. A twin-spool gas turbine turbojet comprising:
a high-pressure rotor;
a low-pressure rotor;
a low-pressure rotor shaft connected to a fan housed in a fan casing at an upstream end of the low-pressure rotor shaft, in reference to a direction of thrust; and
a fixed cowl element centered on an axis of an engine upstream of the fan in the direction of the thrust and on which there is mounted an electric current generator designed to take mechanical power off the low-pressure rotor shaft and convert it into electrical power.

2. The turbojet as claimed in claim 1, wherein the current generator includes a stator element connected to the fixed cowl element, and a rotor element driven by the upstream end of the low-pressure rotor shaft.

3. The turbojet as claimed in claim 2, wherein
power transmission pinions are formed respectively on the rotor element of the current generator and on the upstream end of the low-pressure rotor shaft, and
the power transmission pinions mesh with one another to transmit rotational movement of the low-pressure rotor shaft to the rotor element of the current generator.

4. The turbojet as claimed in claim 1, further comprising:
a fan disk on which fan blades are mounted, in which a rotor element of the current generator is rotationally driven by a journal secured to said fan disk.

5. The turbojet as claimed in one of claims 3 and 4, wherein the cowl element is connected to the fan casing by radial retaining arms.

6. The turbojet as claimed in claim 5, wherein ducts for lubricating the current generator are formed in the radial retaining arms.

7. The turbojet as claimed in claim 5, wherein electric cables are formed in the radial retaining arms.

8. The turbojet as claimed in claim 1, wherein the fan includes a moving cowl element of a frustoconical shape and the fixed cowl element is upstream of the moving cowl element in the direction of the thrust.

9. The turbojet as claimed in claim 2, wherein the rotor element is an electromagnet extending axially along the axis of the engine and the stator element includes windings that extend coaxially with the rotor element.

10. The turbojet as claimed in claim 4, wherein the journal is mounted between the fan disk and the rotor element and the journal is connected by a screw-nut connection to the fan disk and to the rotor element.

11. The turbojet as claimed in claim 6, wherein electric cables are formed in the radial retaining arms.

12. A method of mounting a current generator in the fan of a gas turbojet including a high-pressure rotor; a low-pressure rotor; a low-pressure rotor shaft connected to a fan housed in a fan casing at an upstream end of the low-pressure rotor shaft, in reference to a direction of thrust; and a fixed cowl element centered on an axis of an engine upstream of the fan in the direction of the thrust and on which there is mounted an electric current generator designed to take mechanical power off the low-pressure rotor shaft and convert it into electrical power, the method comprising:
mounting the current generator on the fixed cowl element;
positioning the fixed cowl element on the fan in such a way that the rotor element of the generator is in contact with the upstream end of the low-pressure rotor shaft; and
immobilizing the cowl element on the fan casing with radial retaining arms.

13. A twin-spool gas turbine turbojet comprising:
a high-pressure rotor;
a low-pressure rotor;
a low-pressure rotor shaft connected to a fan housed in a fan casing at an upstream end of the low-pressure rotor shaft, in reference to a direction of thrust; and
a fixed cowl element centered on an axis of an engine upstream of the fan in the direction of the thrust and on which there is mounted means for generating electric power from mechanical power of the low-pressure rotor shaft.

* * * * *